United States Patent
Shanbhogue et al.

(10) Patent No.: US 10,831,679 B2
(45) Date of Patent: Nov. 10, 2020

(54) SYSTEMS, METHODS, AND APPARATUSES FOR DEFENDING AGAINST CROSS-PRIVILEGE LINEAR PROBES

(71) Applicant: Intel Corporation, Santa Clara, CA (US)

(72) Inventors: Vedvyas Shanbhogue, Austin, TX (US); Joseph Nuzman, Haifa (IL); Baiju Patel, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/934,916

(22) Filed: Mar. 23, 2018

(65) Prior Publication Data

US 2019/0294559 A1    Sep. 26, 2019

(51) Int. Cl.
*G06F 12/14* (2006.01)
*G06F 12/02* (2006.01)
*G06F 21/52* (2013.01)

(52) U.S. Cl.
CPC ...... *G06F 12/1408* (2013.01); *G06F 12/0223* (2013.01); *G06F 21/52* (2013.01)

(58) Field of Classification Search
CPC ..... G06F 12/1408; G06F 12/023; G06F 21/52
USPC ....................................................... 711/163
See application file for complete search history.

(56) References Cited

U.S. PATENT DOCUMENTS

| | | |
|---|---|---|
| 5,140,684 A | 8/1992 | Sakamura et al. |
| 5,623,636 A | 4/1997 | Revilla et al. |
| 6,516,395 B1 | 2/2003 | Christie |
| 2003/0093686 A1 | 5/2003 | Barnes et al. |
| 2003/0188169 A1* | 10/2003 | Strongin ............. G06F 12/1483 713/181 |
| 2014/0365742 A1* | 12/2014 | Patel ..................... G06F 12/145 711/163 |
| 2017/0242803 A1 | 8/2017 | McCarthy et al. |

OTHER PUBLICATIONS

International Search Report and Written Opinion for Application No. PCT/US2019/022238 dated Jun. 26, 2019, 12 pages.

* cited by examiner

*Primary Examiner* — Hua J Song
(74) *Attorney, Agent, or Firm* — Nicholson De Vos Webster & Elliott LLP

(57) ABSTRACT

Systems, methods, and apparatuses for defending against cross-privilege linear access are described. For example, an implementation of an apparatus comprising privilege level storage to store a current privilege level and address check circuitry coupled to the privilege level storage, wherein the address check circuitry is to determine whether a linear address associated with an instruction is allowed to access a partition of a linear address space of the apparatus based upon a comparison of the current privilege level and a most significant bit of the linear address is described.

18 Claims, 16 Drawing Sheets

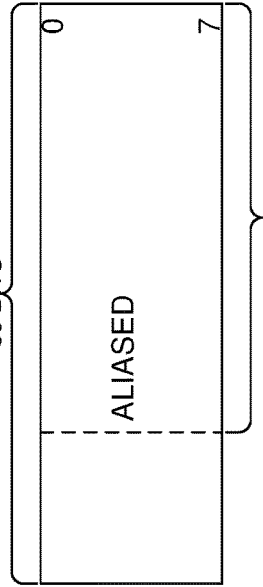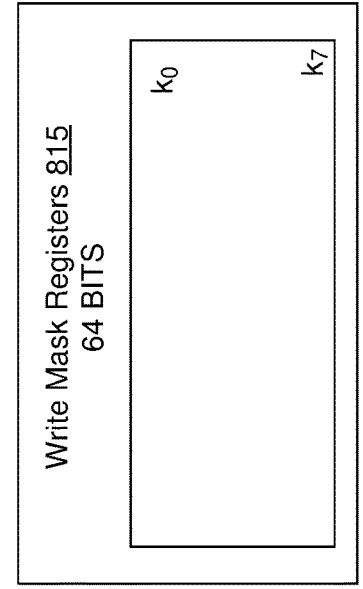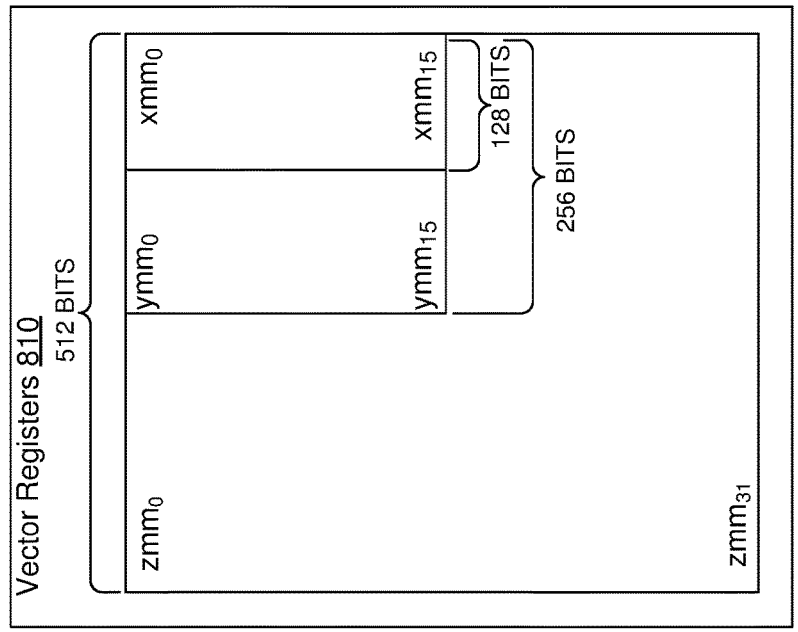
FIG. 8

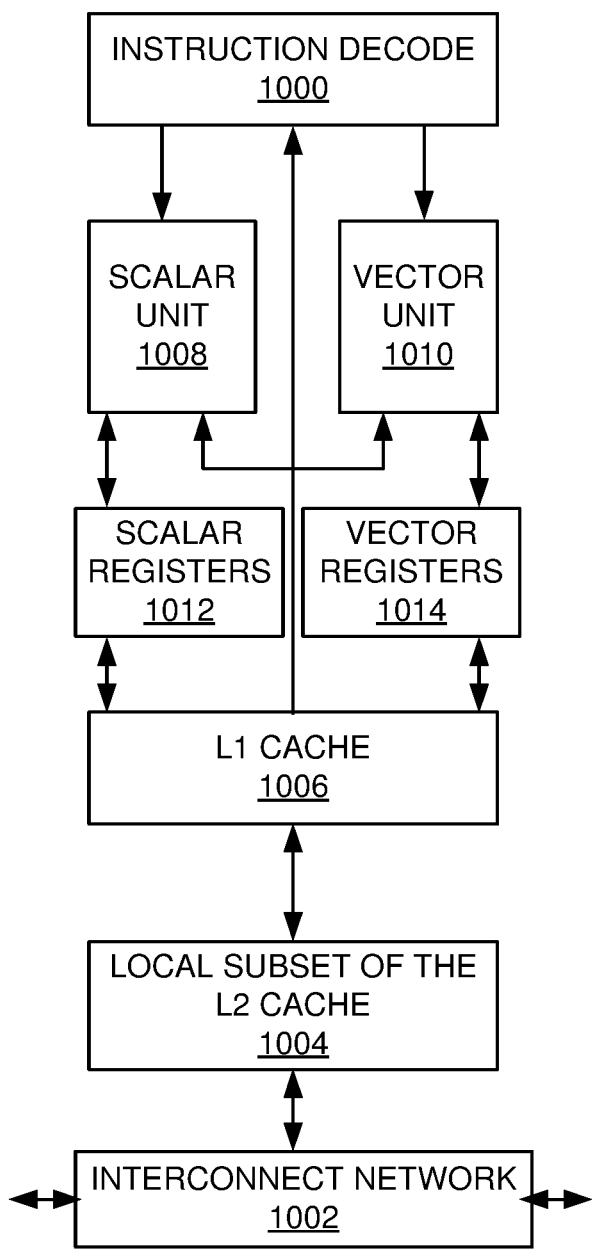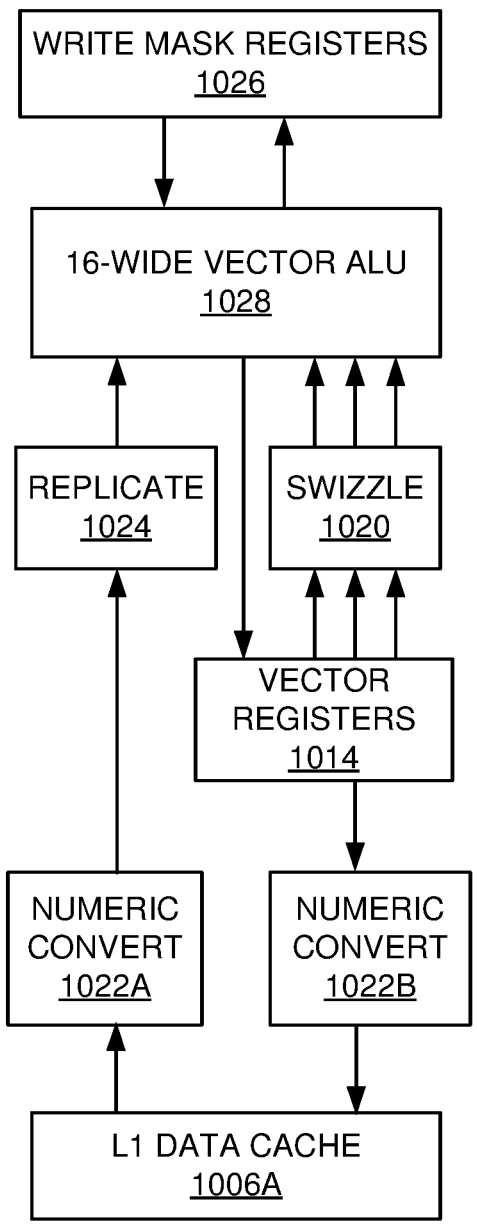

SYSTEMS, METHODS, AND APPARATUSES FOR DEFENDING AGAINST CROSS-PRIVILEGE LINEAR PROBES

FIELD OF INVENTION

The field of invention relates generally to computer processor architecture, and, more specifically, to attempt to secure supervisor and user address spaces.

BACKGROUND

A variety of exploit techniques have been developed to break kernel address space layout randomization (KASLR) which allows attackers to craft customized payloads by bypassing the randomization. These techniques rely on following properties: 1) user/supervisor permission based faults required page table walks; 2) speculative accesses to supervisor code/data from user space will still lead to page walks however the operating system is not notified of this as the access is speculative and the faults are never delivered; and 3) certain instructions like software prefetch instructions and cache line demote (e.g., CLDEMOTE) never deliver a fault, but are silently dropped on fault.

BRIEF DESCRIPTION OF THE DRAWINGS

The present invention is illustrated by way of example and not limitation in the figures of the accompanying drawings, in which like references indicate similar elements and in which:

FIG. 8 is a block diagram of a register architecture according to one embodiment of the invention;

FIG. 10A-B illustrate a block diagram of a more specific exemplary in-order core architecture, which core would be one of several logic blocks (including other cores of the same type and/or different types) in a chip;

DETAILED DESCRIPTION

Figure 1:
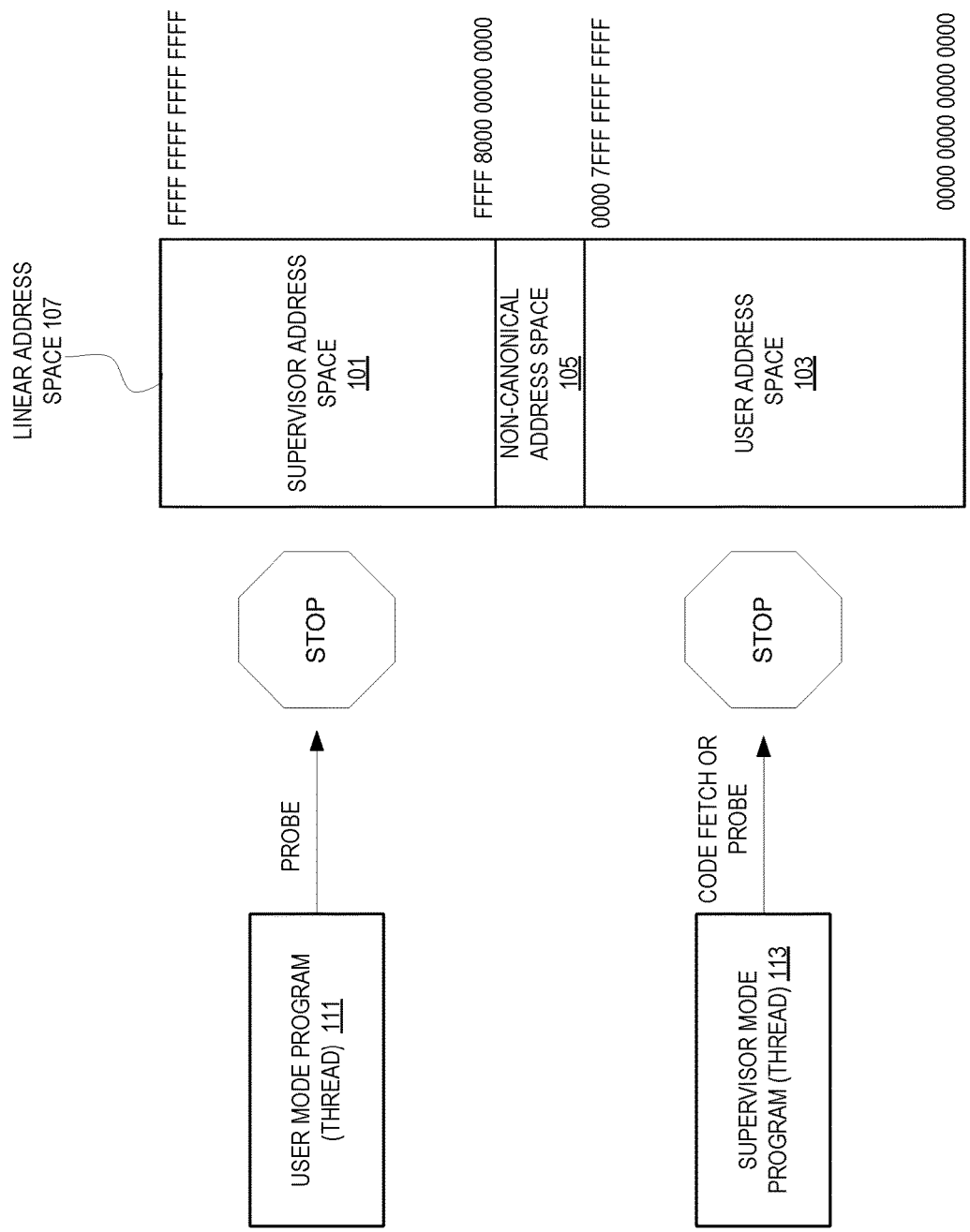
FIG. 1 illustrates embodiments of partitioning linear address space and the types of accesses to these partitions that may be stopped.

In the following description, numerous specific details are set forth. However, it is understood that embodiments of the invention may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In some approaches to addressing the above, separate page tables are used for user and supervisor spaces. Unfortunately, the use of these tables has the following disadvantages: there are performance overheads due to having to switch page tables on kernel entry/exit as well as not being able to use global pages in the kernel page tables, there is additional memory overhead of having to maintain the two page tables, and there is software overhead and complexity of managing the two page tables. Additionally, the user page table will still need to have some supervisor mappings (for example, for trampoline pages, descriptor tables, etc.) which can allow the leaking of kernel addresses to user mode.

Detailed herein are embodiments of a "kill the probe" approach to defending against unwanted cross-privilege access. In particular, the linear address space available to user and/or supervisor mode programs (threads) is partitioned into at least a "user address space" and a "supervisor address space." In some embodiments, this partitioning is based on the bit 63 (the most significant bit) of a 64-bit the linear address. For example, in some embodiments, positive addresses (linear addresses that have bit 63 set to 0) are user addresses and belong to the user address space and negative addresses (linear addresses that have bit 63 set to 1) are supervisor addresses and belong to the supervisor address space. In other embodiments, positive addresses (linear addresses that have bit 63 set to 0) are supervisor addresses and belong to the supervisor address space and negative addresses (linear addresses that have bit 63 set to 1) are user addresses and belong to the user address space.

With kill the probe (KTP) enabled, a user mode load/store/code-fetch to supervisor addresses generally causes a general protection fault and a supervisor mode code-fetch to user mode addresses generally causes a general protection fault. This fault is delivered at address generation time (for example, without lookup of any translation lookaside buffer (TLB) or doing any page walks), or by a frontend as will be detailed. This closes an entire class of attack techniques used to probe the kernel address space layout and without imposing onerous additional memory or performance overhead.

FIG. 1 illustrates embodiments of partitioning linear address space and the types of accesses to these partitions that may be stopped. As shown, a canonical linear address space is split into a supervisor address space 101 and a user address space 103. In some embodiments, a non-canonical address space 105 lies between these spaces 101 and 103. In this example, a 64-bit canonical linear address space is illustrated, however, smaller, or larger address spaces may be used. A single bit is used to delineate between spaces.

As illustrated, the supervisor address space 101 is from FFFF 8000 0000 0000 to FFFF FFFF FFFF FFFF. This is a "negative" address space in that linear addresses that have bit 63 set to 1 are supervisor addresses. The user address space 103 is from 0000 0000 0000 0000 to 0000 7FFF FFFF FFFF. The user address space 103 is a "positive" address space in that linear addresses that have bit 63 set to 0 are user addresses.

An access from a user mode program (thread) 111 using a linear address is allowed to user address space 103, but, in general, probes from the user mode program (thread) 111 should be stopped from reaching the supervisor address space 101.

Similarly, an access from a supervisor mode program (thread) 113 using a linear address is allowed to supervisor address space 101, but, in general, code fetches or probes from the supervisor mode program (thread) 113 should be stopped from reaching the user address space 103.

Figure 2:
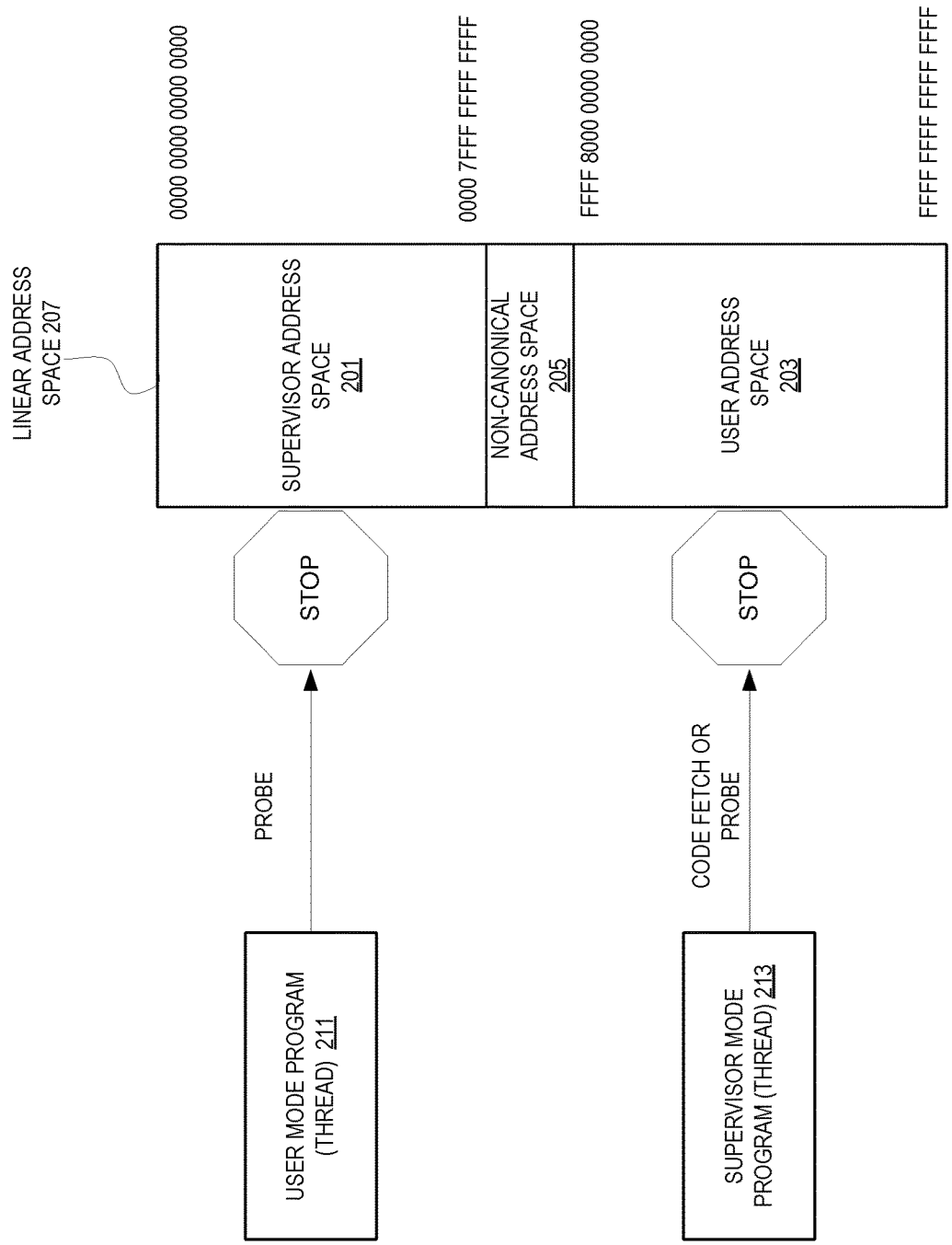
FIG. 2 illustrates embodiments of partitioning linear address space and the types of accesses to these partitions that may be stopped.

FIG. 2 illustrates embodiments of partitioning linear address space and the types of accesses to these partitions that may be stopped. As shown, a canonical linear address space is split into a supervisor address space 201 and a user address space 203. In some embodiments, a non-canonical address space 205 lies between these spaces 201 and 203. In this example, a 64-bit canonical linear address space is illustrated, however, smaller, or larger address spaces may be used.

As illustrated, the user address space 203 goes from FFFF 8000 0000 0000 to FFFF FFFF FFFF FFFF. This is a "negative" address space in that linear addresses that have bit 63 set to 1 are user addresses. The supervisor address space 201 goes from 0000 0000 0000 0000 to 0000 7FFF FFFF FFFF. The supervisor address space 201 is a "positive" address space in that linear addresses that have bit 63 set to 0 are user addresses.

An access from a user mode program (thread) 211 using a linear address is allowed to user address space 203, but, in general, probes from the user mode program (thread) 211 should be stopped from reaching the supervisor address space 201.

Similarly, an access from a supervisor mode program (thread) 213 using a linear address is allowed to supervisor address space 201, but, in general, code fetches or probes from the supervisor mode program (thread) 213 should be stopped from reaching the user address space 203.

Figure 3:
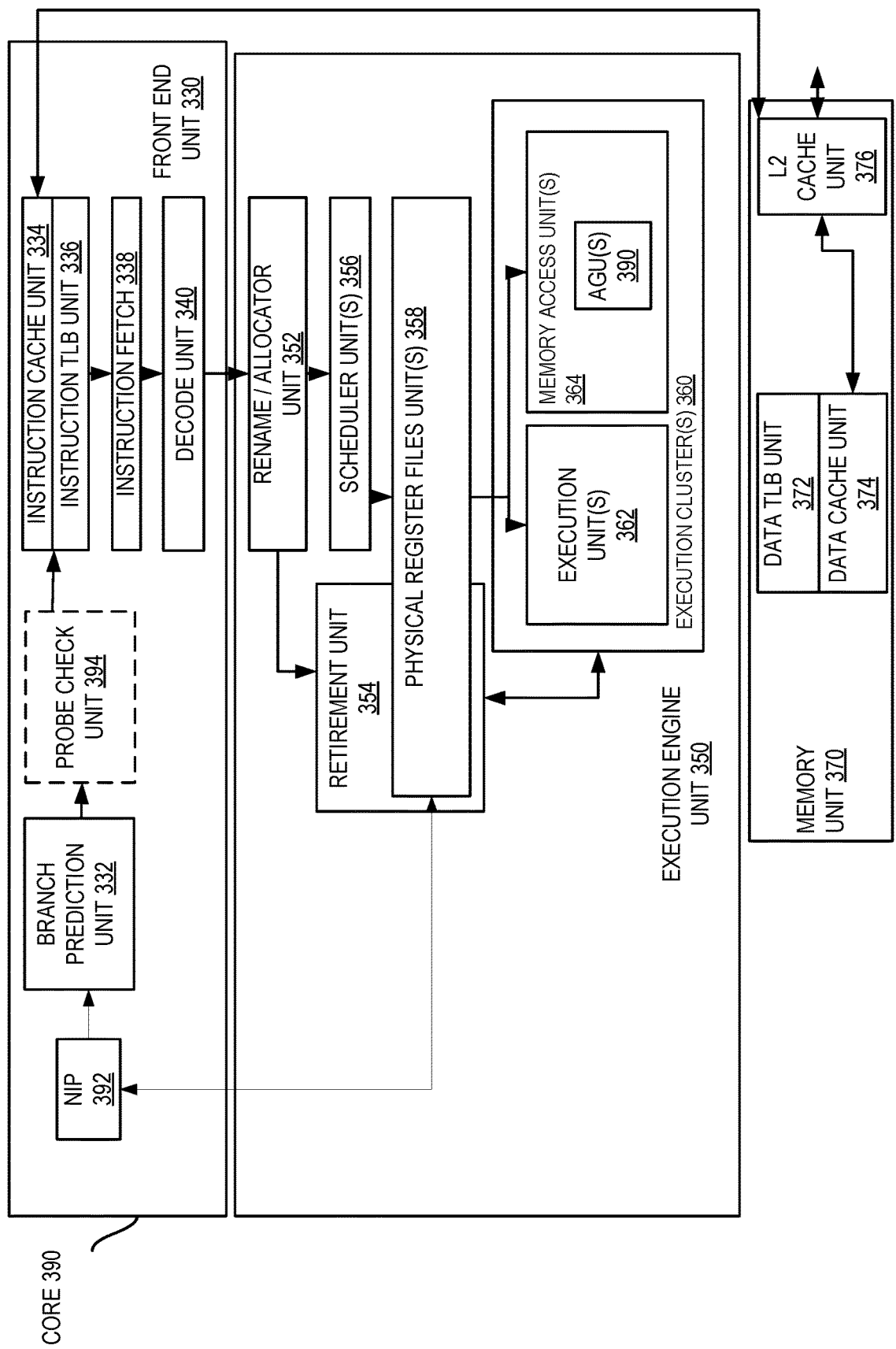
FIG. 3 illustrates embodiments of circuitry of a processor core supporting KTP.

Techniques for KTP may be implemented in various parts of a processor core. FIG. 3 illustrates embodiments of circuitry of a processor core supporting KTP. In particular, embodiments detailed herein include one or more of a probe check unit 394 in the front end unit 330 and access check circuitry in address generation circuit 390.

The probe check unit 394 is between a next instruction pointer (NIP) generator 392 and the instruction TLB unit 836 and instruction cache unit 334.

The probe check unit 394 stops code fetches or probes from user mode programs (threads) from accessing the supervisor linear address space. Upon determining that an access is not allowed, the probe check unit 394 causes a fault and/or cancels speculative code fetches access. In some embodiments, no TLB lookups, page walks, or instruction cache lookups are performed upon determining that an access is not allowed. Further, in some embodiments, the probe check unit 394 generates a fault when the current privilege level is user mode, KTP is enabled, paging is enabled, physical address extension (PAE) is utilized, long mode is enabled, and the most significant bit of the linear address of the code fetch or probe is set to indicate the address is in the supervisor address space.

However, in some embodiments, a range of supervisor addresses are made available to the user space (user mode programs (threads)) through a bypass range. In some embodiments, this range is specified in a model specific register (MSR). For example, bits maximum linear address (MAX_LA):39 of this MSR define a bypass prefix and when the linear address[MAX_LA-1:39] is equal to the bypass prefix, then KTP enforcement is not performed for access from a user mode program (thread) into this range.

The probe check unit 394 stops code fetches or probes from supervisor mode programs (threads) into the user linear address space. The probe check unit 394 causes a fault and/or cancels speculative code fetches upon determining that an access is not allowed. In some embodiments, no TLB lookups, page walks, or instruction cache lookups are performed upon determining that an access is not allowed. Further, in some embodiments, the probe check unit 394 generates a fault when the current privilege level is supervisor mode, KTP is enabled, paging is enabled, physical address extension (PAE) is utilized, long mode is enabled, and the most significant bit of the linear address of the code fetch or probe is set to indicate the address is in the user address space.

The address generation unit 390 determines when there are non-supervisory linear accesses made from a user mode program (thread) into a supervisor address space. Examples of non-supervisory linear access operations include, but are not limited to, one or more linear access operations including instructions for loads, stores, cache line flushes (e.g., CLFLUSH or CLFLUSHOPT), cache line demotion (e.g., CLDEMOTE), and cache line write back (e.g., CLWB) that attempts to utilize a linear address in the supervisor space addresses, or for prefetches to supervisor space addresses. In some embodiments, a non-supervisory linear access operation is one that is made from user mode, but not to some segment registers and their associated addressed tables (such as a global descriptor table register, a local descriptor table register, an interrupt descriptor table register, and/or a task register), and is a linear access operation (instruction or prefetch). Note, this means that a global descriptor table register, a local descriptor table register, an interrupt descriptor table register, and/or a task register may still be allowed.

The address generation unit 390 determines when there are supervisory linear accesses made from a supervisor mode program (thread) into a user address space. Examples of supervisory linear accesses operations include, but are not limited to, one or more linear access operations including instructions for loads, stores, cache line flushes (e.g., CLFLUSH or CLFLUSHOPT), cache line demotion (e.g., CLDEMOTE), and cache line write back (e.g., CLWB) that attempts to utilize a linear address in the user space addresses, or for prefetches to user space addresses. In some embodiments, a supervisory linear access operation is one that is not performed in user mode, or to a global descriptor table register, a local descriptor table register, an interrupt descriptor table register, and/or a task register that is a linear access operation.

The core 390 may be a reduced instruction set computing (RISC) core, a complex instruction set computing (CISC) core, a very long instruction word (VLIW) core, or a hybrid or alternative core type. As yet another option, the core 390 may be a special-purpose core, such as, for example, a network or communication core, compression engine, coprocessor core, general purpose computing graphics processing unit (GPGPU) core, graphics core, or the like.

The front end unit 330 includes a branch prediction unit 332 coupled to an instruction cache unit 334, which is coupled to an instruction translation lookaside buffer (TLB) 336, which is coupled to an instruction fetch unit 338, which is coupled to a decode unit 340. The decode unit 340 (or decoder) may decode instructions, and generate as an output one or more micro-operations, micro-code entry points, microinstructions, other instructions, or other control signals, which are decoded from, or which otherwise reflect, or are derived from, the original instructions. The decode unit 340 may be implemented using various different mechanisms. Examples of suitable mechanisms include, but are not limited to, look-up tables, hardware implementations, programmable logic arrays (PLAs), microcode read only memories (ROMs), etc. In one embodiment, the core 390 includes a microcode ROM or other medium that stores microcode for certain macroinstructions (e.g., in decode unit 340 or otherwise within the front end unit 330). The decode unit 340 is coupled to a rename/allocator unit 352 in the execution engine unit 350.

The execution engine unit 350 includes the rename/allocator unit 352 coupled to a retirement unit 354 and a set of one or more scheduler unit(s) 356. The scheduler unit(s) 356 represents any number of different schedulers, including reservations stations, central instruction window, etc. The scheduler unit(s) 356 is coupled to the physical register file(s) unit(s) 358. Each of the physical register file(s) units 358 represents one or more physical register files, different ones of which store one or more different data types, such as scalar integer, scalar floating point, packed integer, packed floating point, vector integer, vector floating point, control and status (e.g., an instruction pointer that is the address of the next instruction to be executed and/or a control and status register), etc. In one embodiment, the physical register file(s) unit 358 comprises a vector registers unit and a scalar registers unit. These register units may provide architectural vector registers, vector mask registers, and general purpose registers. The physical register file(s) unit(s) 358 is overlapped by the retirement unit 354 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 354 and the physical register file(s) unit(s) 358 are coupled to the execution cluster(s) 360. The execution cluster(s) 360 includes a set of one or more execution units 362 and a set of one or more memory access units 364. The execution units 362 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 356, physical register file(s) unit(s) 358, and execution cluster(s) 360 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster— and in the case of a separate memory access pipeline, certain embodiments are implemented in which only the execution cluster of this pipeline has the memory access unit(s) 364). It should also be understood that where separate pipelines are used, one or more of these pipelines may be out-of-order issue/execution and the rest in-order.

The set of memory access units 364 is coupled to the memory unit 370, which includes a data TLB unit 372 coupled to a data cache unit 374 coupled to a level 2 (L2) cache unit 376. In one exemplary embodiment, the memory access units 364 may include a load unit, a store address unit, and a store data unit, each of which is coupled to the data TLB unit 372 in the memory unit 370. The instruction cache unit 334 is further coupled to a level 2 (L2) cache unit 376 in the memory unit 370. The L2 cache unit 376 is coupled to one or more other levels of cache and eventually to a main memory.

By way of example, the exemplary register renaming, out-of-order issue/execution core architecture may implement the pipeline 300 as follows: 1) the instruction fetch 338 performs the fetch and length decoding stages 302 and 304; 2) the decode unit 340 performs the decode stage 306; 3) the rename/allocator unit 352 performs the allocation stage 308 and renaming stage 310; 4) the scheduler unit(s) 356 performs the schedule stage 312; 5) the physical register file(s) unit(s) 358 and the memory unit 370 perform the register read/memory read stage 314; the execution cluster 360 perform the execute stage 316; 6) the memory unit 370 and the physical register file(s) unit(s) 358 perform the write back/memory write stage 318; 7) various units may be involved in the exception handling stage 322; and 8) the retirement unit 354 and the physical register file(s) unit(s) 358 perform the commit stage 324.

The core 390 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 390 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 334/374 and a shared L2 cache unit 376, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 4:
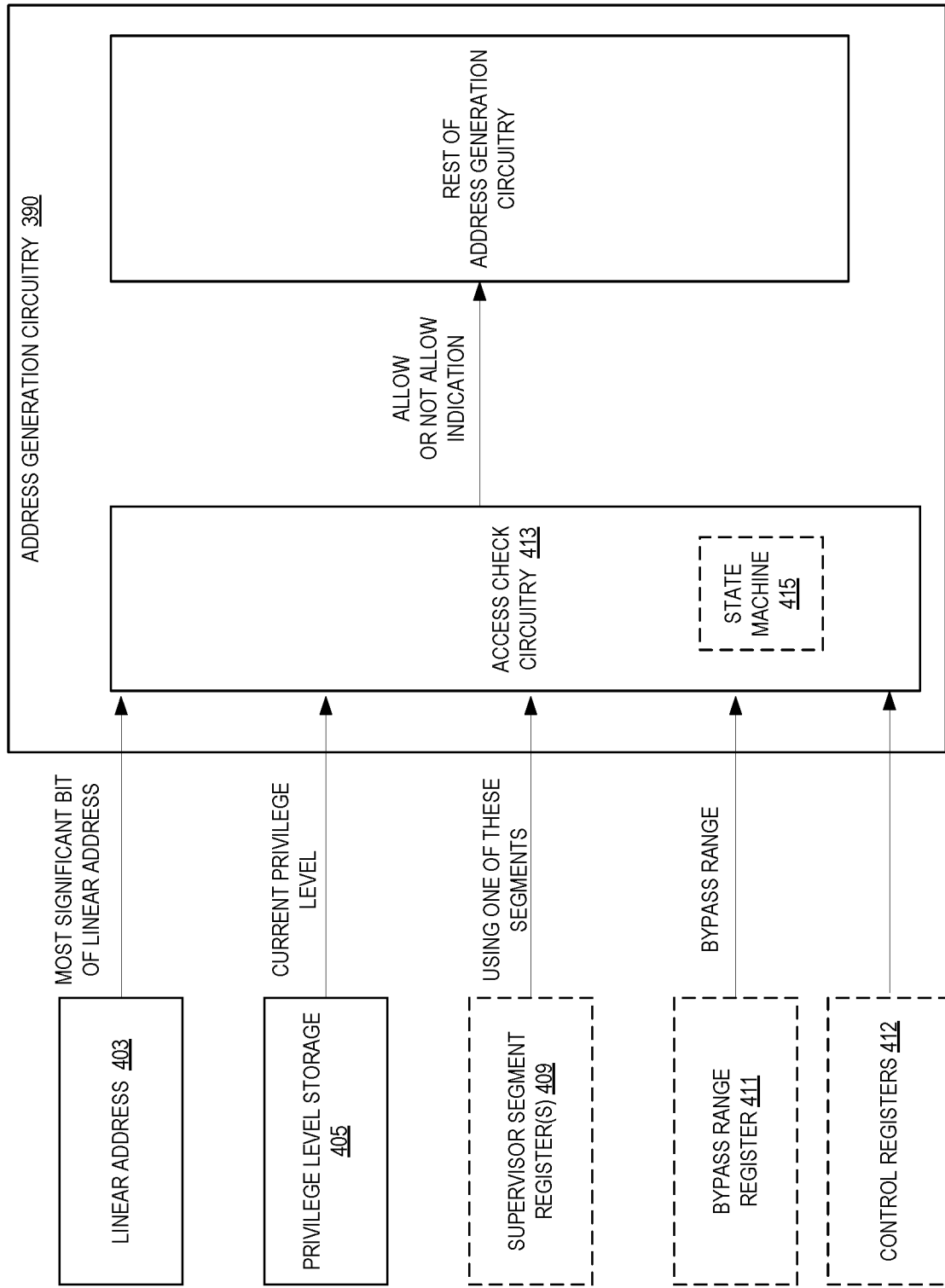
FIG. 4 illustrates embodiments of aspects of address generation circuitry.

FIG. 4 illustrates embodiments of aspects of address generation circuitry 390. Access check circuitry 413 determines if a requested access is allowed or not, and provides this indication to the rest of the address generation circuitry 390 (which will perform regular address generation functions). The address generation circuitry 390 receives a plurality of inputs to make this determination.

As shown, the address generation circuitry 390 receives a portion of linear address 403 used by a linear access instruction or prefetch request at access circuitry 413. In particular, the most significant bit of the linear address is received.

A current privilege level is received from a privilege level storage 405. For example, an indication of if the current privilege level is a user level (for example, ring 3) or a supervisor level (for example, ring 0) is received from the privilege level storage 405. In some embodiments, the privilege level storage 405 is a segment register.

In some embodiments, an indication of if supervisor segment register(s) 409 are being requested (e.g., a global descriptor table register, a local descriptor table register, an interrupt descriptor table register, and/or a task register) by the instruction or prefetch is provided to the access check circuitry. In some embodiments, an indication of the use of a bypass range register 411 and its value is received by the access check circuitry 413.

The access check circuitry 413 also receives input from one or more control registers 412 in some embodiments. For example, input from a control register of if KTP is enabled, if paging is enabled, if physical address extension (PAE) is utilized, and if long mode is enabled are received. In some embodiments, control register 4 (CR4) provides the indication of KTP and PAE, CR0 provides an indication of if paging is enabled (CR.PG), and an extended feature enable register provides an indication of if long mode is enabled (IA32_EFER.LME). For example, is the paging mode 64-bit (e.g., IA-32e 4-level paging)?

In some embodiments, the access check circuitry 413 is a combinational logic circuit designed to perform the operations detailed above as one or more methods. In other embodiments, access check circuitry 413 runs a state machine 415 to perform one or more methods. An example of embodiments of such methods is detailed with respect to FIG. 5.

Figure 5:
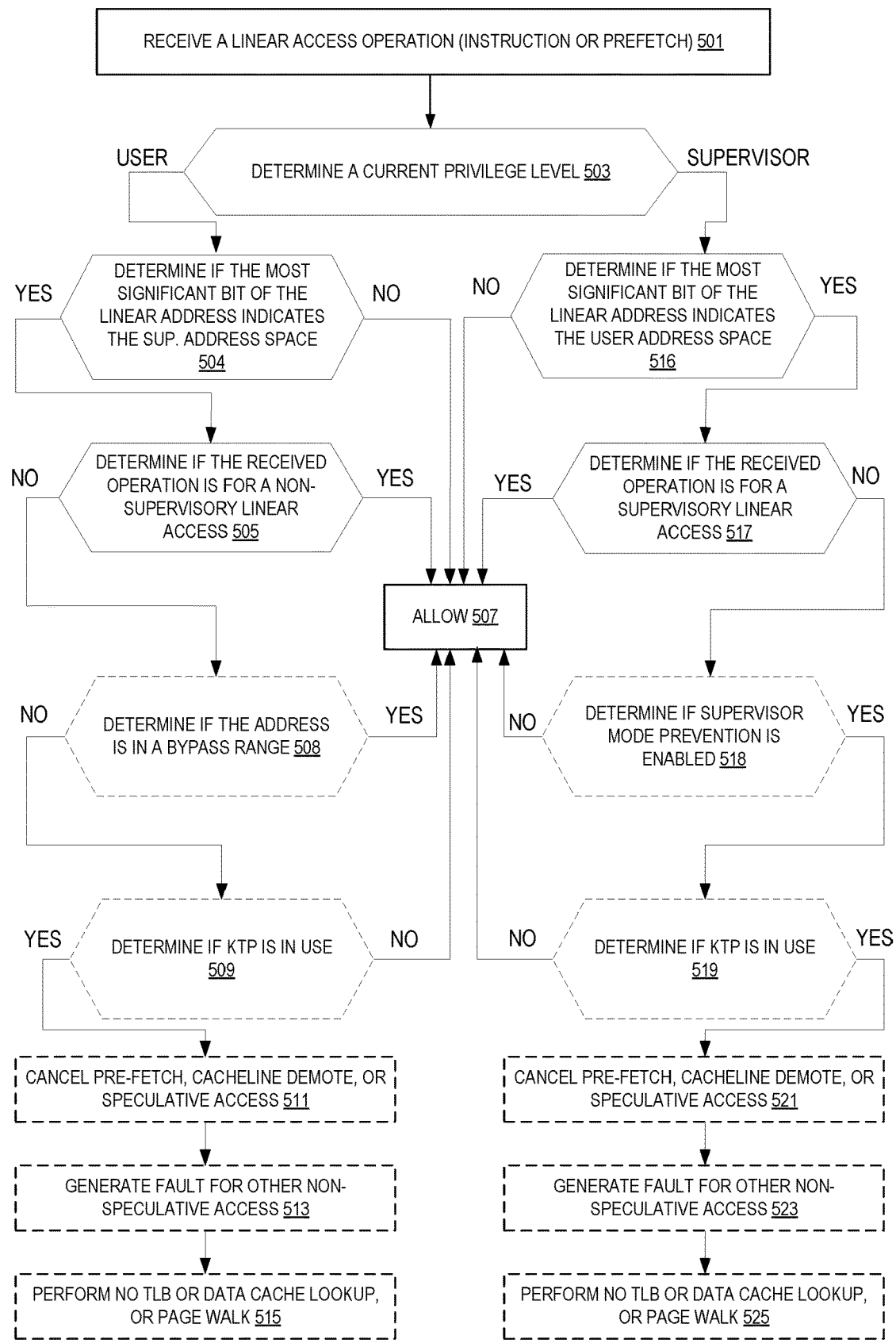
FIG. 5 illustrates embodiments of a method performed by address generation circuitry in response to a linear access instruction or prefetch.

FIG. 5 illustrates embodiments of a method performed by address generation circuitry in response to a linear access instruction or prefetch. In some embodiments, embodiments of the method are performed using a state machine.

At 501, a linear access operation (instruction or a prefetch request), is received. Examples of such instructions have been detailed above.

At 503, a determination of a current privilege level (CPL) is made at 503. For example, the CPL is retrieved from privilege level storage 405. In this example, there are only two privilege levels of interest, user and supervisor.

When the determined CPL is user (for example, level 3), a determination of if the most significant bit of the linear address of the received operation is set to indicate that the address is a part of the supervisor address space is made at 504. For example, in some embodiments, when this bit is set to 1 (embodiments where the supervisor address space is negative), then this determination indicates that the operation has a user CPL and the access is potentially not allowed.

When the most significant bit of the linear address of the received operation is not set to indicate that the address is a part of the supervisor address space, access to the linear address space is allowed at 507 and regular address generation tasks continue, and the operation may be performed (for example, a physical address is generated or retrieved, and the operation (such as load, etc.) may be performed).

When the most significant bit of the linear address of the received operation is set to indicate that the address is a part of the supervisor address space, access to the linear address space is not allowed. A determination of if the received operation is for a non-supervisory linear access is then made at 505. For example, is the operation to a global descriptor table register, a local descriptor table register, an interrupt descriptor table register, and/or a task register that is a linear access and is in the user privilege level? In other words, a non-supervisory linear access is ((CPL==3 && !GDTR && !LDTR && !DTR && !TR) & a linear access).

When the operation is a non-supervisory linear access, it is allowed at 507 and regular address generation tasks continue, and the operation may be performed (for example, a physical address is generated or retrieved, and the operation (such as load, etc.) may be performed).

In some embodiments, when the operation is a supervisory linear access, a determination of if the address used by of the received operation is in a bypass range made at 508. Of course, bypass range must be enabled and set for this to be true. When the address is within the bypass range, it is allowed at 507, and regular address generation tasks continue, and the operation may be performed (for example, a physical address is generated or retrieved, and the operation (such as load, etc.) may be performed).

When the there is no bypass used (or if the address is not within the bypass range), in some embodiments, a determination of if KTP is in use is made at 509. For example, in some embodiments, a control register (such as CR4) includes a bit to be set when KTP is in use. When KTP is not in use, then the operation is allowed at 507 and regular address generation tasks continue, and the operation may be performed (for example, a physical address is generated or retrieved, and the operation (such as load, etc.) may be performed). Note the operations of 508 and 509 are reversed in some embodiments.

When KTP is in use, in some embodiments, when the operation is one of a software pre-fetch instruction, a cache line demote instruction, or speculative access that instruction or speculative access is canceled at 511.

When KTP is in use, in some embodiments, a fault for non-speculative access is generated at 513. For example, in some embodiments when KTP, PAE, paging is enabled, long mode is enabled, and the linear address indicates a supervisor address and the access is non-supervisory, a fault is signaled. In other words, when ((C4.KTP &&CR0.PG && CR4.PAE && IA32_EFER.LME && LA[63]) && a non-supervisory linear access) a fault is generated in some embodiments.

When KTP is in use, in some embodiments, no TLB or data cache lookups, nor page walks are performed at 515.

When the determined CPL is supervisor (for example, level 0), a determination of if the most significant bit of the linear address of the received operation is set to indicate that the address is a part of the user address space is made at 516. For example, in some embodiments, when this bit is set to 0 (embodiments where the user address space is positive), then this determination indicates that the operation has a supervisor CPL and the access is potentially not allowed.

When the most significant bit of the linear address of the received operation is set to indicate that the address is a part of the supervisor address space, access to the linear address space is allowed at 507 and regular address generation tasks continue, and the operation may be performed (for example, a physical address is generated or retrieved, and the operation (such as load, etc.) may be performed).

When the most significant bit of the linear address of the received operation is not set to indicate that the address is a part of the supervisor address space, access to the linear address space is not allowed. A determination of if the received operation is for a supervisory linear access is then made at 517. For example, is the operation to a global descriptor table register, a local descriptor table register, an interrupt descriptor table register, and/or a task register that is a linear access and is in the supervisor privilege level? In other words, a supervisory linear access is ((CPL==!3∥GDTR∥LDTR∥DTR∥TR) & a linear access).

When the operation is a supervisory linear access, it is allowed at 507 and regular address generation tasks continue, and the operation may be performed (for example, a physical address is generated or retrieved, and the operation (such as load, etc.) may be performed).

In some embodiments, when the operation is a non-supervisory linear access, a determination of if supervisor mode access prevention (SMAP) is enabled is a made at 518. In SMAP, supervisor mode programs may optionally set user space memory mappings so that access to those mappings from supervisor mode will cause a trap. In some embodiments, this determination is performed by checking the status of if SMAP and alignment check are enabled.

When SMAP is not enabled, the operation is allowed at 507 and regular address generation tasks continue, and the operation may be performed (for example, a physical address is generated or retrieved, and the operation (such as load, etc.) may be performed).

When SMAP is being used, or if not available, in some embodiments, a determination of if KTP is in use is made at 519. For example, in some embodiments, a control register (such as CR4) includes a bit to be set when KTP is in use. When KTP is not in use, then the operation is allowed at 507 and regular address generation tasks continue, and the operation may be performed (for example, a physical address is generated or retrieved, and the operation (such as load, etc.) may be performed). Note the operations of 518 and 519 are reversed in some embodiments.

When KTP is in use, in some embodiments, when the operation is one of a software pre-fetch instruction, a cache line demote instruction, or speculative access, that instruction or speculative access is canceled at 521.

When KTP is in use, in some embodiments, a fault for non-speculative access is generated at 513. For example, in some embodiments when KTP, PAE, paging is enabled, long mode is enabled, and the linear address indicates a user address and the access is supervisory, a fault is signaled. In other words, when ((C4.KTP &&CR0.PG && CR4.PAE && IA32_EFER.LME && !LA[63]) && a supervisory linear access) a fault is generated in some embodiments.

When KTP is in use, in some embodiments, no TLB or data cache lookups, nor page walks are performed at 525.

Figure 6:
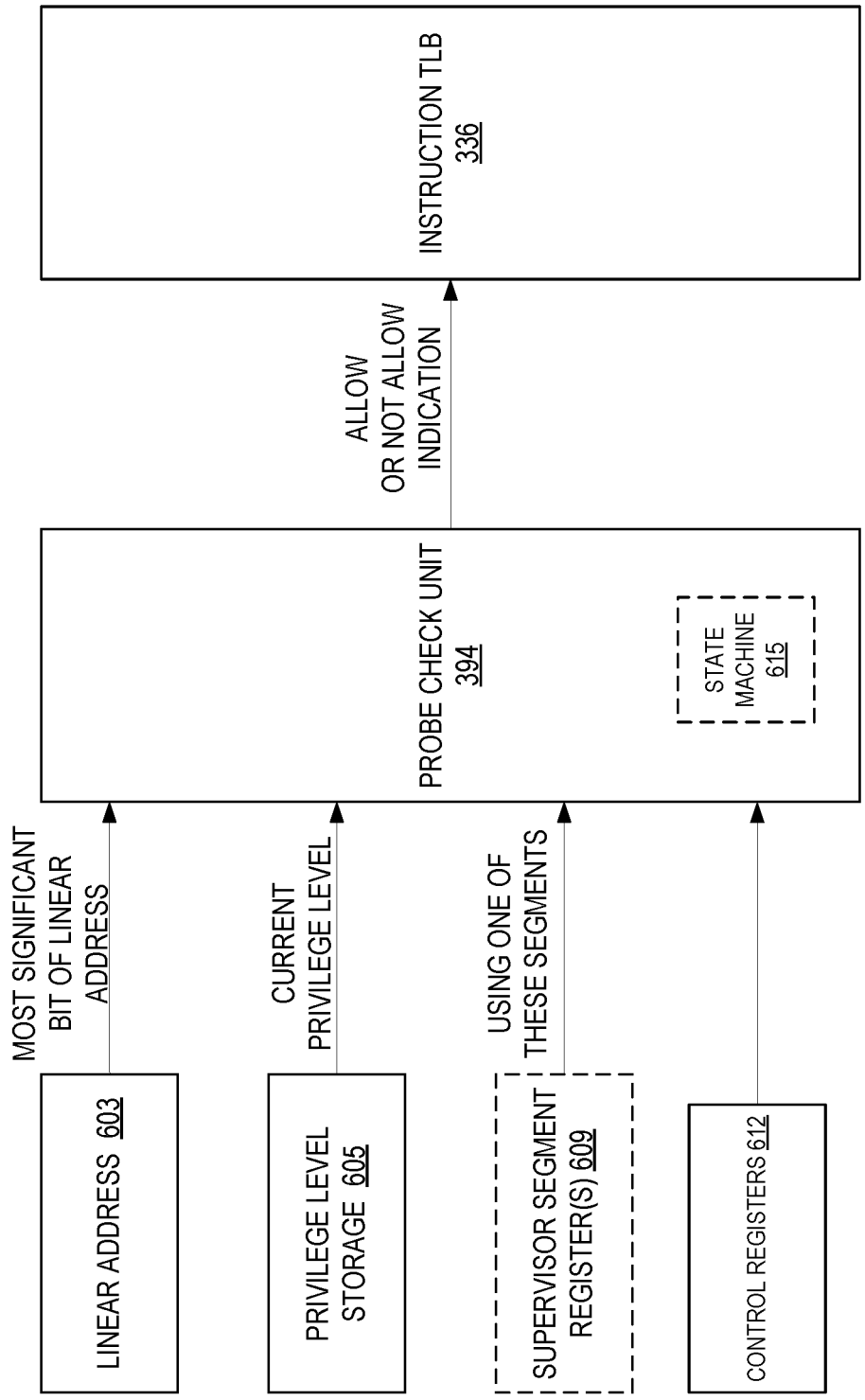
FIG. 6 illustrates embodiments of aspects of a probe check unit.

FIG. 6 illustrates embodiments of aspects of a probe check unit 394. Probe check unit 394 determines if a requested access is allowed or not, and provides this indication to the instruction TLB 336, or instruction cache 334. The probe check unit 394 receives a plurality of inputs to make this determination.

As shown, the probe check unit 394 receives a portion of linear address 603 used by a linear access instruction or prefetch request at access circuitry 613. In particular, the most significant bit of the linear address is received in some embodiments.

A current privilege level is received from a privilege level storage 605. For example, an indication of if the current privilege level is a user level (for example, ring 3) or a supervisor level (for example, ring 0) is received from the privilege level storage 605. In some embodiments, the privilege level storage 605 is a segment register.

In some embodiments, an indication of if supervisor segment register(s) 609 are being requested (e.g., a global descriptor table register, a local descriptor table register, an interrupt descriptor table register, and/or a task register) by the instruction or fetch is provided to the access check circuitry.

The probe check unit 394 also receives input from one or more control registers. For example, input from a control register of if KTP is enabled, if paging is enabled, if physical address extension (PAE) is utilized, and if long mode is enabled are received. In some embodiments, control register 4 (CR4) provides the indication of KTP and PAE, CR0 provides an indication of if paging is enabled (CR.PG), and an extended feature enable register provides an indication of if long mode is enabled (IA32_EFER.LME). For example, is the paging mode 64-bit (e.g., IA-32e 4-level paging)?

In some embodiments, the probe check unit 394 is a combinational logic circuit designed to perform the operations detailed above as one or more methods. In other embodiments, probe check unit 394 runs a state machine 615 to perform one or more methods. An example of embodiments of such methods is detailed with respect to FIG. 7.

Figure 7:
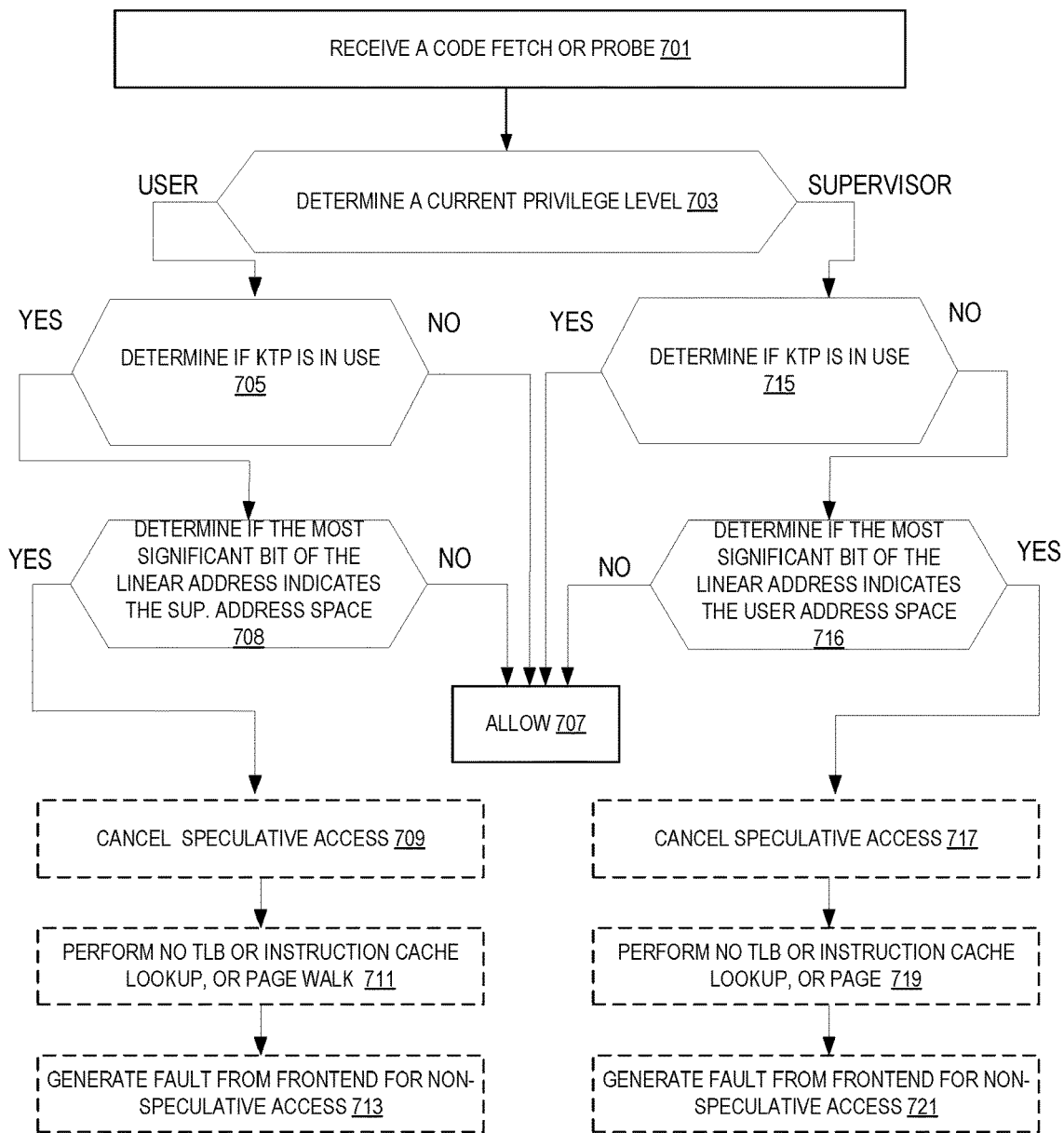
FIG. 7 illustrates embodiments of a method performed by a probe check unit in response to a code fetch or probe.

FIG. 7 illustrates embodiments of a method performed by a probe check unit in response to a code fetch or probe. In some embodiments, embodiments of the method are performed using a state machine.

At 701, a code fetch, or probe, request is received. At 703, a determination of a CPL is made at 703. For example, the CPL is retrieved from privilege level storage 605. In this example, there are only two privilege levels of interest, user and supervisor.

When the CPL is user level, a determination of if KTP is in use is made at 705. For example, in some embodiments, a control register (such as CR4) includes a bit to be set when KTP is in use. When KTP is not in use, then the operation is allowed at 707.

When the determined CPL is user (for example, level 3) and KTP is in use, a determination of if the most significant bit of the linear address of the received operation is set to indicate that the address is a part of the supervisor address space is made at 708. For example, in some embodiments, when this bit is set to 1 (embodiments where the supervisor address space is negative), then this determination indicates that the operation has a user CPL and the access is potentially not allowed.

When the most significant bit of the linear address of the received operation is not set to indicate that the address is a part of the supervisor address space, access to the linear address space is allowed at 707.

When the most significant bit of the linear address of the received operation is set to indicate that the address is a part of the supervisor address space, access to the linear address space is not allowed.

When the operation is one of speculative access, it is canceled at 709.

No TLB or data cache lookups, nor page walks are performed as shown at 711.

A fault for non-speculative access is generated from the frontend at 713. For example, in some embodiments when KTP, PAE, paging is enabled, long mode is enabled, and the linear address indicates a supervisor address and the CPL is non-supervisory, a fault is signaled. In other words, when ((C4.KTP &&CR0.PG && CR4.PAE && IA32_EFER.LME && LA[63]) && CPL=3) a fault is generated in some embodiments.

When the CPL is supervisory level, a determination of if KTP is in use is made at 715. For example, in some embodiments, a control register (such as CR4) includes a bit to be set when KTP is in use. When KTP is not in use, then the operation is allowed at 717.

When the determined CPL is supervisor (for example, level 0) and KTP is in use, a determination of if the most significant bit of the linear address of the received operation is set to indicate that the address is a part of the user address space is made at 716. For example, in some embodiments, when this bit is set to 0 (embodiments where the user address space is positive), then this determination indicates that the operation has a supervisor CPL and the access is potentially not allowed.

When the most significant bit of the linear address of the received operation is not set to indicate that the address is a part of the user address space, access to the linear address space is allowed at 707.

When the most significant bit of the linear address of the received operation is set to indicate that the address is a part of the user address space, access to the linear address space is not allowed.

When the operation is one of speculative access, it is canceled at 717.

No TLB or data cache lookups, nor page walks are performed as shown at 719.

A fault for non-speculative access is generated from the frontend at 721. For example, in some embodiments, when KTP, PAE, paging is enabled, long mode is enabled, and the linear address indicates a supervisor address and the CPL is non-supervisory, a fault is signaled. In other words, when ((C4.KTP &&CR0.PG && CR4.PAE && IA32_EFER.LME && !LA[63]) && CPL !=3) a fault is generated in some embodiments.

Detailed below are exemplary architectures and systems that may be utilized for the above detailed KTP.

Exemplary Register Architecture

FIG. 8 is a block diagram of a register architecture 800 according to one embodiment of the invention.

Control register 845 store control information including that detailed above such as KTP usage, SMAP usage, etc.

In the embodiment illustrated, there are 32 vector registers 810 that are 512 bits wide; these registers are referenced as zmm0 through zmm31. The lower order 256 bits of the lower 11 zmm registers are overlaid on registers ymm0-15. The lower order 128 bits of the lower 11 zmm registers (the lower order 128 bits of the ymm registers) are overlaid on registers xmm0-15.

General-purpose registers 825—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 845, on which is aliased the MMX packed integer flat register file 850—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the invention may use wider or narrower registers. Additionally, alternative embodiments of the invention may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures. Detailed herein are circuits (units) that comprise exemplary cores, processors, etc.

Exemplary Core Architectures

In-Order and Out-of-Order Core Block Diagram

Figure 9:
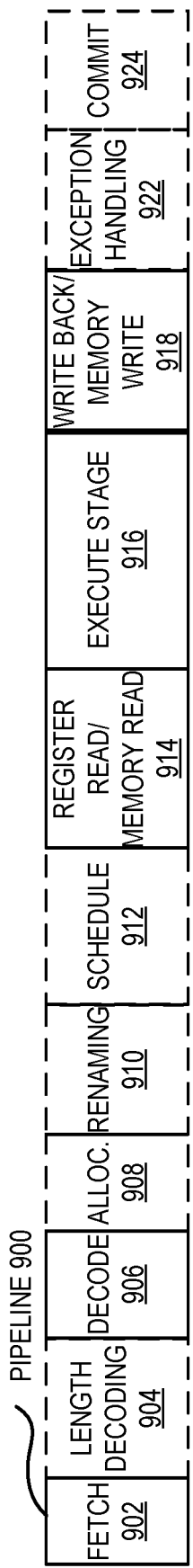
FIG. 9 is a block diagram illustrating both an exemplary in-order pipeline and an exemplary register renaming, out-of-order issue/execution pipeline according to embodiments of the invention.

FIG. 9A is a block diagram illustrating both an exemplary in-order pipeline and an exemplary register renaming, out-of-order issue/execution pipeline according to embodiments of the invention. FIG. 9B is a block diagram illustrating both an exemplary embodiment of an in-order architecture core and an exemplary register renaming, out-of-order issue/execution architecture core to be included in a processor according to embodiments of the invention. The solid lined boxes in FIGS. 9A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 9A, a processor pipeline 900 includes a fetch stage 902, a length decode stage 904, a decode stage 906, an allocation stage 908, a renaming stage 910, a scheduling (also known as a dispatch or issue) stage 912, a register read/memory read stage 914, an execute stage 916, a write back/memory write stage 918, an exception handling stage 922, and a commit stage 924.

Specific Exemplary In-Order Core Architecture

FIGS. 10A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 10A is a block diagram of a single processor core, along with its connection to the on-die interconnect network 1002 and with its local subset of the Level 2 (L2) cache 1004, according to embodiments of the invention. In one embodiment, an instruction decoder 1000 supports the x86 instruction set with a packed data instruction set extension. An L1 cache 1006 allows low-latency accesses to cache memory into the scalar and vector units. While in one embodiment (to simplify the design), a scalar unit 1008 and a vector unit 1010 use separate register sets (respectively, scalar registers 1012 and vector registers 1014) and data transferred between them is written to memory and then read back in from a level 1 (L1) cache 1006, alternative embodiments of the invention may use a different approach (e.g., use a single register set or include a communication path that allow data to be transferred between the two register files without being written and read back).

The local subset of the L2 cache 1004 is part of a global L2 cache that is divided into separate local subsets, one per processor core. Each processor core has a direct access path to its own local subset of the L2 cache 1004. Data read by a processor core is stored in its L2 cache subset 1004 and can be accessed quickly, in parallel with other processor cores accessing their own local L2 cache subsets. Data written by a processor core is stored in its own L2 cache subset 1004 and is flushed from other subsets, if necessary. The ring network ensures coherency for shared data. The ring network is bi-directional to allow agents such as processor cores, L2 caches and other logic blocks to communicate with each other within the chip. Each ring data-path is 1024-bits wide per direction in some embodiments.

FIG. 10B is an expanded view of part of the processor core in FIG. 10A according to embodiments of the invention. FIG. 10B includes an L1 data cache 1006A part of the L1 cache 1004, as well as more detail regarding the vector unit 1010 and the vector registers 1014. Specifically, the vector unit 1010 is a 11-wide vector processing unit (VPU) (see the 16-wide ALU 1028), which executes one or more of integer, single-precision float, and double-precision float instructions. The VPU supports swizzling the register inputs with swizzle unit 1020, numeric conversion with numeric convert units 1022A-B, and replication with replication unit 1024 on the memory input.

Processor with Integrated Memory Controller and Graphics

Figure 11:
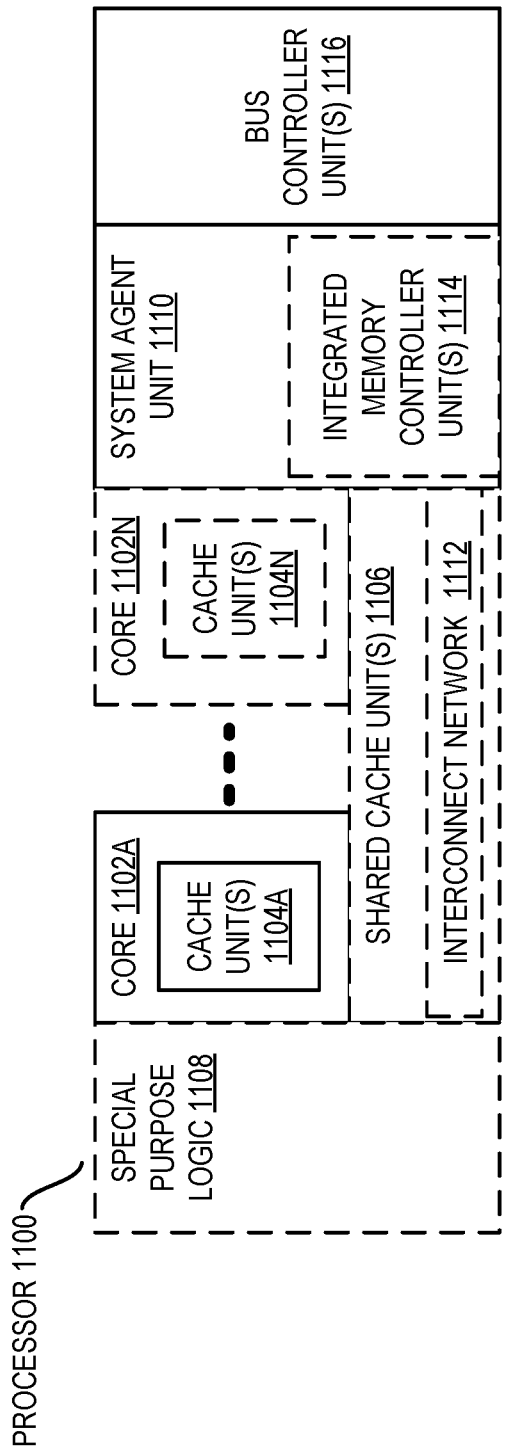
FIG. 11 is a block diagram of a processor that may have more than one core, may have an integrated memory controller, and may have integrated graphics according to embodiments of the invention.

FIG. 11 is a block diagram of a processor 1100 that may have more than one core, may have an integrated memory controller, and may have integrated graphics according to embodiments of the invention. The solid lined boxes in FIG. 11 illustrate a processor 1100 with a single core 1102A, a system agent 1110, a set of one or more bus controller units 1116, while the optional addition of the dashed lined boxes illustrates an alternative processor 1100 with multiple cores 1102A-N, a set of one or more integrated memory controller unit(s) 1114 in the system agent unit 1110, and special purpose logic 1108.

Thus, different implementations of the processor 1100 may include: 1) a CPU with the special purpose logic 1108 being integrated graphics and/or scientific (throughput) logic (which may include one or more cores), and the cores 1102A-N being one or more general purpose cores (e.g., general purpose in-order cores, general purpose out-of-order cores, a combination of the two); 2) a coprocessor with the cores 1102A-N being a large number of special purpose cores intended primarily for graphics and/or scientific (throughput); and 3) a coprocessor with the cores 1102A-N being a large number of general purpose in-order cores. Thus, the processor 1100 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1100 may be a part of and/or may be implemented on one or more substrates using any of a number of process technologies, such as, for example, BiCMOS, CMOS, or NMOS.

The memory hierarchy includes one or more levels of cache within the cores 1104A-N, a set or one or more shared cache units 1106, and external memory (not shown) coupled to the set of integrated memory controller units 1114. The set of shared cache units 1106 may include one or more mid-level caches, such as level 2 (L2), level 3 (L3), level 4 (L4), or other levels of cache, a last level cache (LLC), and/or combinations thereof. While in one embodiment a ring based interconnect unit 1112 interconnects the integrated graphics logic 1108, the set of shared cache units 1106, and the system agent unit 1110/integrated memory controller unit(s) 1114, alternative embodiments may use any number of well-known techniques for interconnecting such units. In one embodiment, coherency is maintained between one or more cache units 1106 and cores 1102-A-N.

In some embodiments, one or more of the cores 1102A-N are capable of multithreading. The system agent 1110 includes those components coordinating and operating cores 1102A-N. The system agent unit 1110 may include for example a power control unit (PCU) and a display unit. The PCU may be or include logic and components needed for regulating the power state of the cores 1102A-N and the integrated graphics logic 1108. The display unit is for driving one or more externally connected displays.

The cores 1102A-N may be homogenous or heterogeneous in terms of architecture instruction set; that is, two or more of the cores 1102A-N may be capable of execution the same instruction set, while others may be capable of executing only a subset of that instruction set or a different instruction set.

Exemplary Computer Architectures

FIGS. 12-15 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 12:
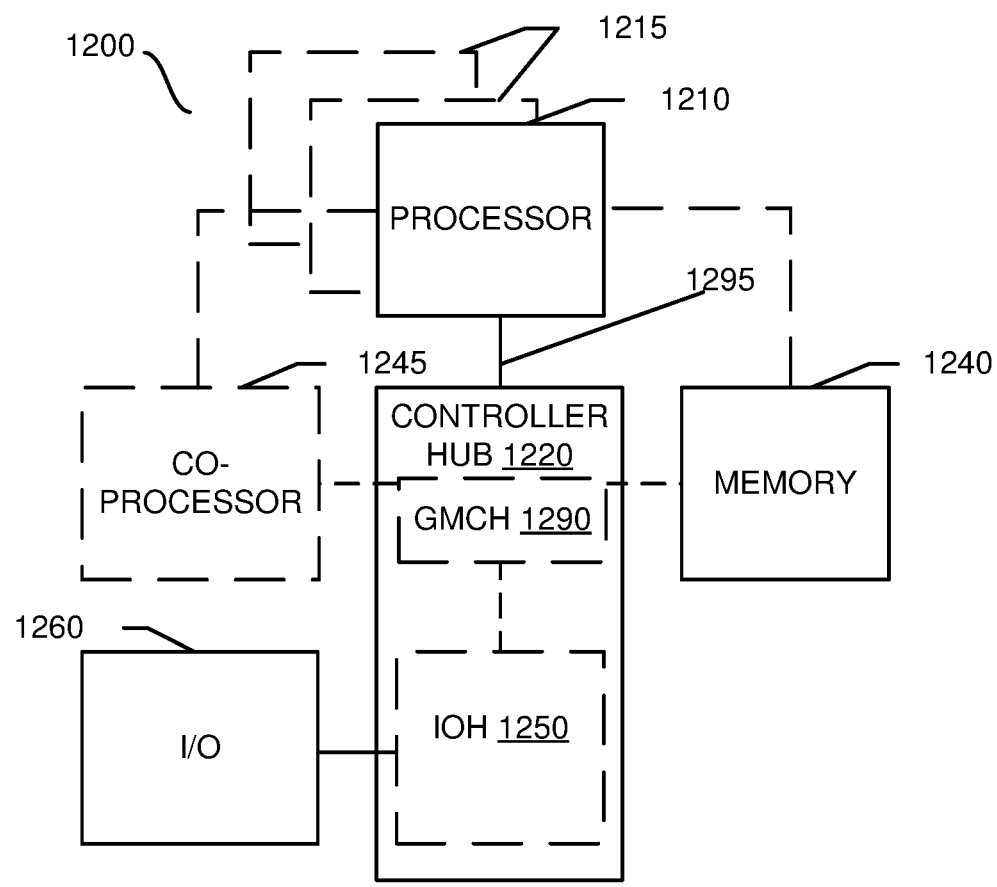
FIGS. 12-15 are block diagrams of exemplary computer architectures.

Referring now to FIG. 12, shown is a block diagram of a system 1200 in accordance with one embodiment of the present invention. The system 1200 may include one or more processors 1210, 1215, which are coupled to a controller hub 1220. In one embodiment, the controller hub 1220 includes a graphics memory controller hub (GMCH) 1290 and an Input/Output Hub (IOH) 1250 (which may be on separate chips); the GMCH 1290 includes memory and graphics controllers to which are coupled memory 1240 and a coprocessor 1245; the IOH 1250 is couples input/output (I/O) devices 1260 to the GMCH 1290. Alternatively, one or both of the memory and graphics controllers are integrated within the processor (as described herein), the memory 1240 and the coprocessor 1245 are coupled directly to the processor 1210, and the controller hub 1220 in a single chip with the IOH 1250.

The optional nature of additional processors 1215 is denoted in FIG. 12 with broken lines. Each processor 1210, 1215 may include one or more of the processing cores described herein and may be some version of the processor 1100.

The memory 1240 may be, for example, dynamic random access memory (DRAM), phase change memory (PCM), or a combination of the two. For at least one embodiment, the controller hub 1220 communicates with the processor(s) 1210, 1215 via a multi-drop bus, such as a frontside bus (FSB), point-to-point interface, or similar connection 1295.

In one embodiment, the coprocessor 1245 is a special-purpose processor, such as, for example, a high-throughput MIC processor, a network or communication processor, compression engine, graphics processor, GPGPU, embedded processor, or the like. In one embodiment, controller hub 1220 may include an integrated graphics accelerator.

There can be a variety of differences between the physical resources 1210, 12155 in terms of a spectrum of metrics of merit including architectural, microarchitectural, thermal, power consumption characteristics, and the like.

In one embodiment, the processor 1210 executes instructions that control data processing operations of a general type. Embedded within the instructions may be coprocessor instructions. The processor 1210 recognizes these coprocessor instructions as being of a type that should be executed by the attached coprocessor 1245. Accordingly, the processor 1210 issues these coprocessor instructions (or control signals representing coprocessor instructions) on a coprocessor bus or other interconnect, to coprocessor 1245. Coprocessor(s) 1245 accept and execute the received coprocessor instructions.

Figure 13:
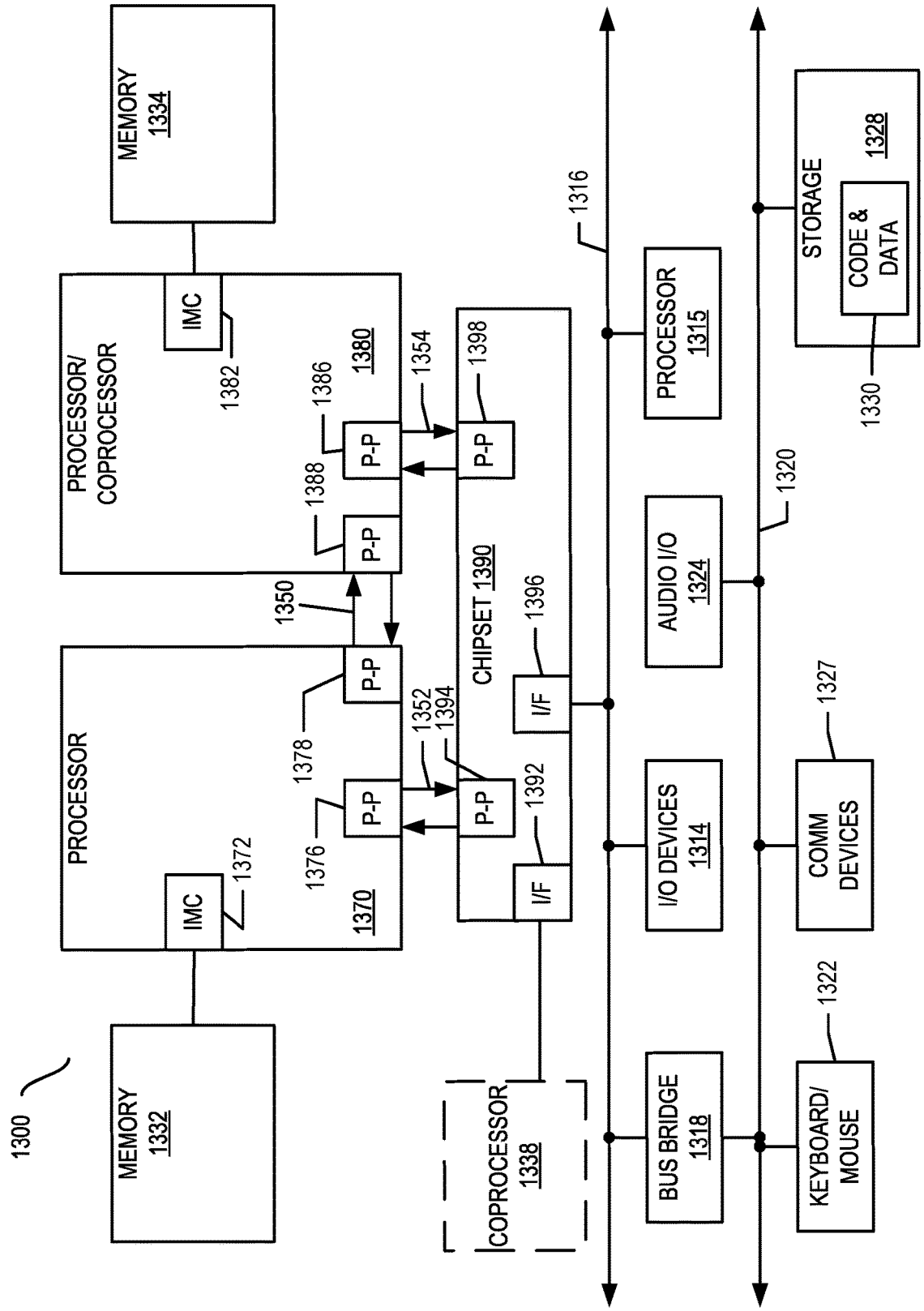

Referring now to FIG. 13, shown is a block diagram of a first more specific exemplary system 1300 in accordance with an embodiment of the present invention. As shown in FIG. 13, multiprocessor system 1300 is a point-to-point interconnect system, and includes a first processor 1370 and a second processor 1380 coupled via a point-to-point interconnect 1350. Each of processors 1370 and 1380 may be some version of the processor 1100. In one embodiment of the invention, processors 1370 and 1380 are respectively processors 1210 and 1215, while coprocessor 1338 is coprocessor 1245. In another embodiment, processors 1370 and 1380 are respectively processor 1210 coprocessor 1245.

Processors 1370 and 1380 are shown including integrated memory controller (IMC) units 1372 and 1382, respectively. Processor 1370 also includes as part of its bus controller units point-to-point (P-P) interfaces 1376 and 1378; similarly, second processor 1380 includes P-P interfaces 1386 and 1388. Processors 1370, 1380 may exchange information via a point-to-point (P-P) interface 1350 using P-P interface circuits 1378, 1388. As shown in FIG. 13, IMCs 1372 and 1382 couple the processors to respective memories, namely a memory 1332 and a memory 1334, which may be portions of main memory locally attached to the respective processors.

Processors 1370, 1380 may each exchange information with a chipset 1390 via individual P-P interfaces 1352, 1354 using point to point interface circuits 1376, 1394, 1386, 1398. Chipset 1390 may optionally exchange information with the coprocessor 1338 via a high-performance interface 1392. In one embodiment, the coprocessor 1338 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1390 may be coupled to a first bus 1316 via an interface 1396. In one embodiment, first bus 1316 may be a Peripheral Component Interconnect (PCI) bus, or a bus such as a PCI Express bus or another I/O interconnect bus, although the scope of the present invention is not so limited.

As shown in FIG. 13, various I/O devices 1314 may be coupled to first bus 1316, along with a bus bridge 1318 which couples first bus 1316 to a second bus 1320. In one embodiment, one or more additional processor(s) 1315, such as coprocessors, high-throughput MIC processors, GPGPU's, accelerators (such as, e.g., graphics accelerators or digital signal processing (DSP) units), field programmable gate arrays, or any other processor, are coupled to first bus 1316. In one embodiment, second bus 1320 may be a low pin count (LPC) bus. Various devices may be coupled to a second bus 1320 including, for example, a keyboard and/or mouse 1322, communication devices 1327 and a storage unit 1328 such as a disk drive or other mass storage device which may include instructions/code and data 1330, in one embodiment. Further, an audio I/O 1324 may be coupled to the second bus 1316. Note that other architectures are possible. For example, instead of the point-to-point architecture of FIG. 13, a system may implement a multi-drop bus or other such architecture.

Figure 14:
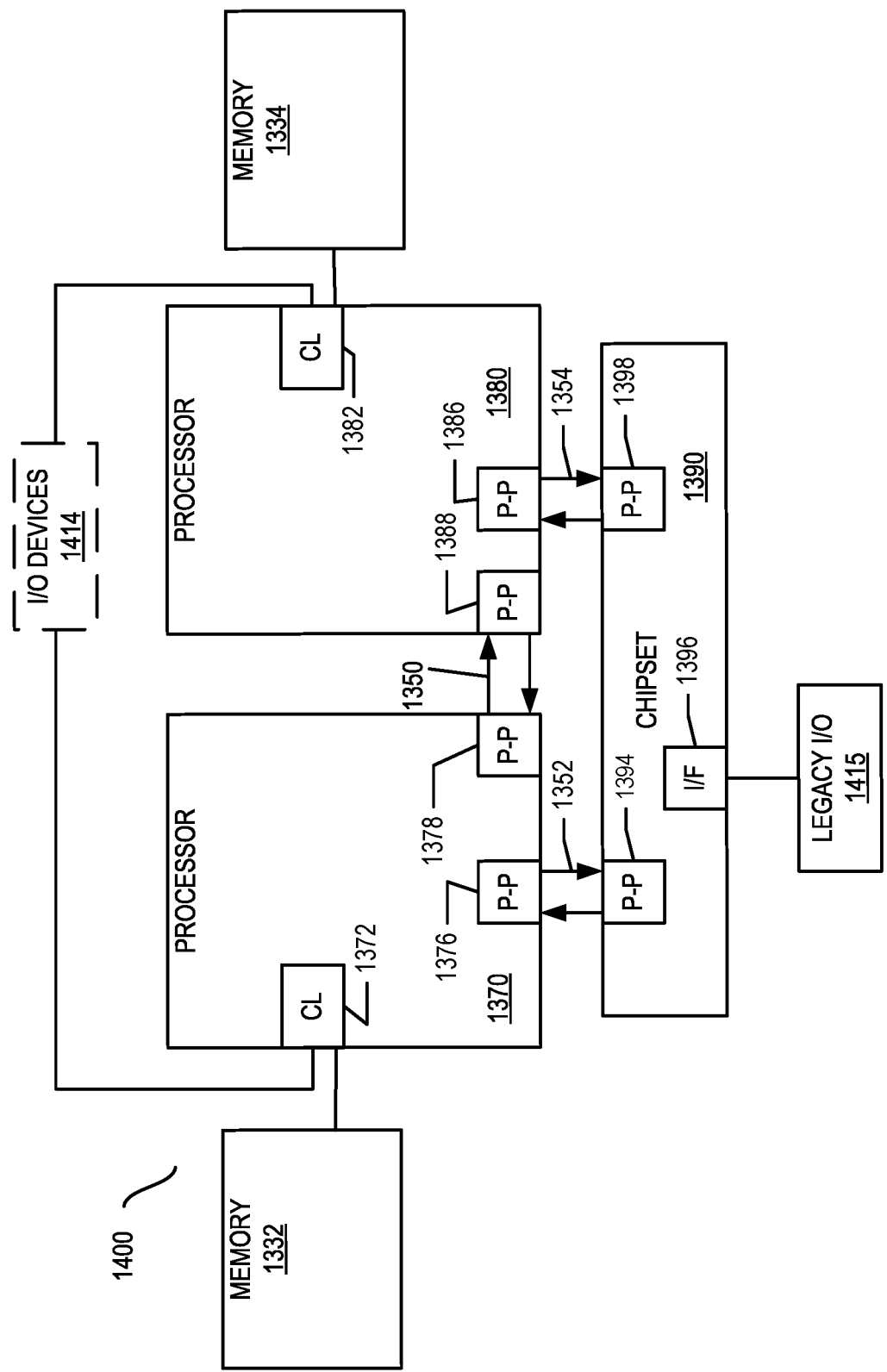

Referring now to FIG. 14, shown is a block diagram of a second more specific exemplary system 1400 in accordance with an embodiment of the present invention. Like elements in FIGS. 13 and 14 bear like reference numerals, and certain aspects of FIG. 13 have been omitted from FIG. 14 in order to avoid obscuring other aspects of FIG. 14.

FIG. 14 illustrates that the processors 1370, 1380 may include integrated memory and I/O control logic ("CL") 1472 and 1482, respectively. Thus, the CL 1472, 1482 include integrated memory controller units and include I/O control logic. FIG. 14 illustrates that not only are the memories 1332, 1334 coupled to the CL 1372, 1382, but also that I/O devices 1414 are also coupled to the control logic 1372, 1382. Legacy I/O devices 1415 are coupled to the chipset 1390.

Figure 15:
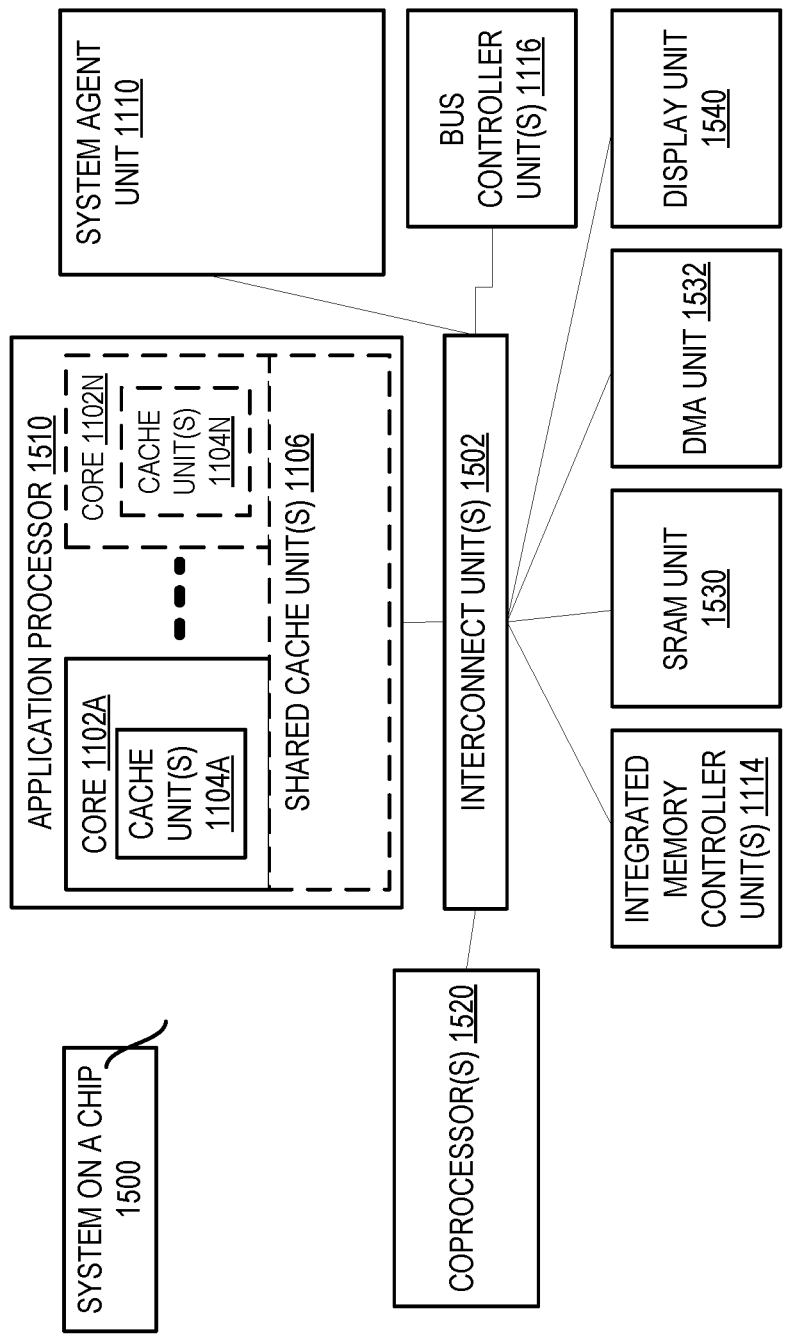

Referring now to FIG. 15, shown is a block diagram of a SoC 1500 in accordance with an embodiment of the present invention. Similar elements in FIG. 11 bear like reference numerals. Also, dashed lined boxes are optional features on more advanced SoCs. In FIG. 15, an interconnect unit(s) 1502 is coupled to: an application processor 1510 which includes a set of one or more cores 152A-N, cache units 1104A-N, and shared cache unit(s) 1106; a system agent unit 1110; a bus controller unit(s) 1116; an integrated memory controller unit(s) 1114; a set or one or more coprocessors 1520 which may include integrated graphics logic, an image processor, an audio processor, and a video processor; an static random access memory (SRAM) unit 1530; a direct memory access (DMA) unit 1532; and a display unit 1540 for coupling to one or more external displays. In one embodiment, the coprocessor(s) 1520 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1330 illustrated in FIG. 13, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMS) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 16:
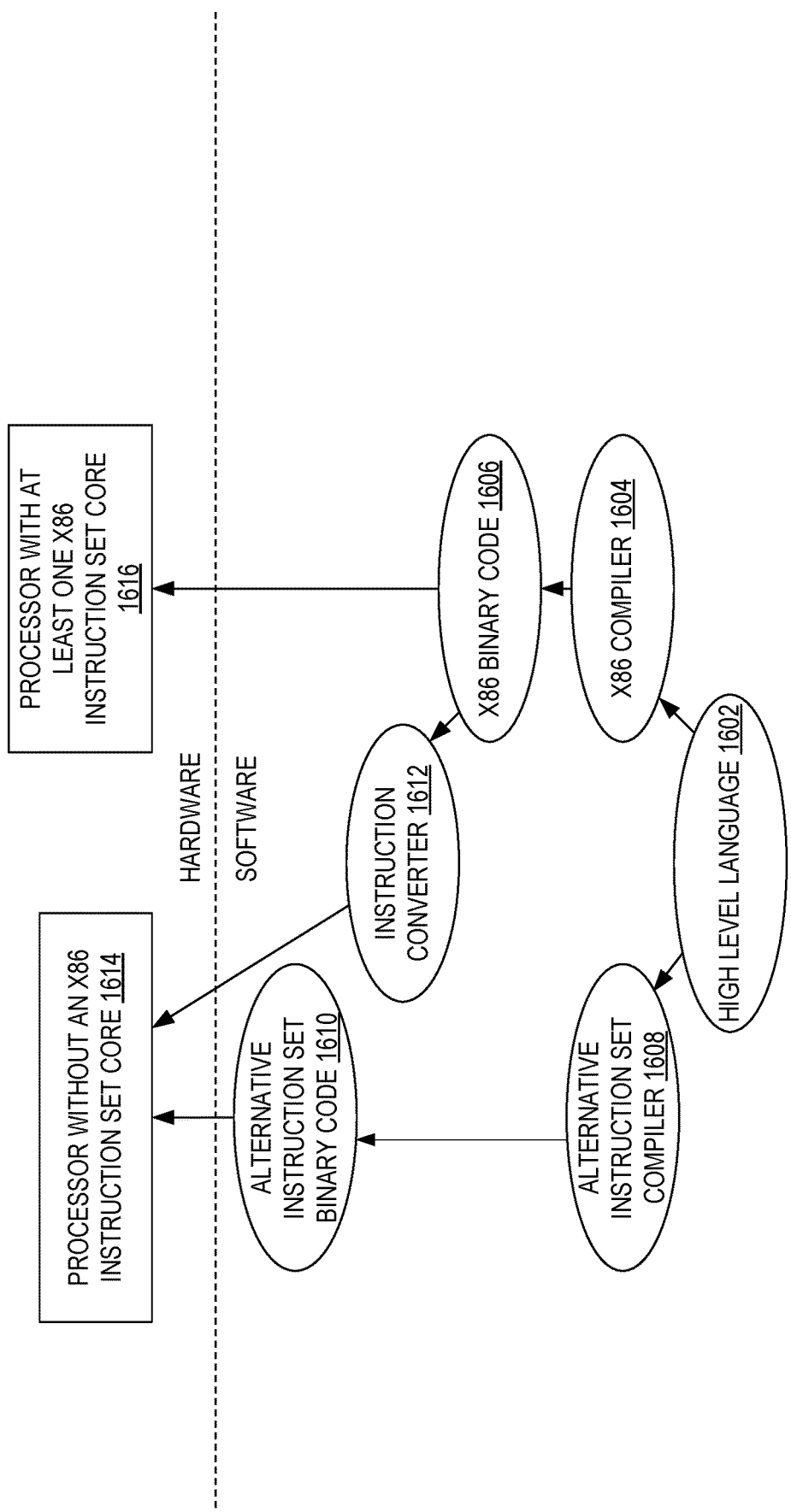
FIG. 16 is a block diagram contrasting the use of a software instruction converter to convert binary instructions in a source instruction set to binary instructions in a target instruction set according to embodiments of the invention.

FIG. 16 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 16 shows a program in a high level language 1602 may be compiled using an first compiler 1604 to generate a first binary code (e.g., x86) 1606 that may be natively executed by a processor with at least one first instruction set core 1616. In some embodiments, the processor with at least one first instruction set core 1616 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The first compiler 1604 represents a compiler that is operable to generate binary code of the first instruction set 1606 (e.g., object code) that can, with or without additional linkage processing, be executed on the processor with at least one first instruction set core 1616. Similarly, FIG. 16 shows the program in the high level language 1602 may be compiled using an alternative instruction set compiler 1608 to generate alternative instruction set binary code 1610 that may be natively executed by a processor without at least one first instruction set core 1614 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1612 is used to convert the first binary code 1606 into code that may be natively executed by the processor without an first instruction set core 1614. This converted code is not likely to be the same as the alternative instruction set binary code 1610 because an instruction converter capable of this is difficult to make; however, the converted code will accomplish the general operation and be made up of instructions from the alternative instruction set. Thus, the instruction converter 1612 represents software, firmware, hardware, or a combination thereof that, through emulation, simulation or any other process, allows a processor or other electronic device that does not have a first instruction set processor or core to execute the first binary code 1606.

Detailed herein are examples of embodiments.

Example 1

An apparatus comprising: privilege level storage to store a current privilege level; address check circuitry coupled to the privilege level storage, wherein the address check circuitry is to determine whether a linear address associated with an instruction is allowed to access a partition of a linear address space of the apparatus based upon a comparison of the current privilege level and a most significant bit of the linear address; and address generation circuitry to generate a physical address from the linear address when the linear address is allowed.

Example 2

The apparatus of example 1, wherein the linear address space comprises a supervisor address space partition and a user address space partition.

Example 3

The apparatus of example 2, wherein when the most significant bit of the linear address is a "1" the linear address space partition is a supervisor address space.

Example 4

The apparatus of example 2, wherein when the most significant bit of the linear address is a "0" the linear address space partition is a supervisor address space.

Example 5

The apparatus of any of examples 1-4, further comprising: a plurality of segment registers, wherein when the linear address associated with an instruction is directed to an access of one of the plurality of segment registers, the address check circuitry is to allow the access.

Example 6

The apparatus of any of examples 1-5, further comprising: a bypass range register to store a bypass range, wherein when the linear address associated with an instruction is directed to an access to a linear address in the bypass range, the address check circuitry is to allow the access.

Example 7

The apparatus of any of examples 1-6, wherein when an access to a partition is not allowed, the address check circuitry is to cause pre-fetches, cacheline demotions, and speculative accesses to be canceled.

Example 8

The apparatus of any of examples 1-7, wherein when an access to a partition is not allowed, the address check circuitry is to generate a fault for non-speculative accesses.

Example 9

The apparatus of any of examples 1-8, wherein when an access to a partition is not allowed, the address generation circuitry is to not perform a translation lookaside buffer or data cache lookup.

Example 10

The apparatus of any of examples 1-9, wherein the address check circuitry further comprises a state machine to be executed to determine if an access to a linear address space is allowed.

Example 11

An apparatus comprising: privilege level storage to store a current privilege level; and probe check circuitry coupled to the privilege level storage, wherein the address check circuitry is to determine whether a linear address associated with a probe is allowed to access a partition of a linear address space of the apparatus based upon a comparison of the current privilege level and a most significant bit of the linear address.

Example 12

The apparatus of example 11, wherein the linear address space comprises a supervisor address space partition and a user address space partition.

Example 13

The apparatus of example 12, wherein when the most significant bit of the linear address is a "1" the linear address space partition is a supervisor address space.

Example 14

The apparatus of example 12, wherein when the most significant bit of the linear address is a "0" the linear address space partition is a supervisor address space.

Example 15

The apparatus of any of examples 11-14, further comprising: a plurality of segment registers, wherein when the linear address associated with the probe is directed to an access of one of the plurality of segment registers, the probe check circuitry is to allow the access.

Example 16

The apparatus of any of examples 11-15, wherein when an access to a partition is not allowed, the address check circuitry is to cause speculative accesses to be canceled.

Example 17

The apparatus of any of examples 11-16, wherein when an access to a partition is not allowed, the probe check circuitry is to generate a fault for non-speculative accesses.

Example 18

The apparatus of any of examples 11-17, wherein when an access to a partition is not allowed, there is not translation lookaside buffer or instruction cache lookup.

Example 19

The apparatus of any of examples 11-18, wherein the probe check circuitry further comprises a state machine to be executed to determine if an access to a linear address space is allowed.

Example 20

The apparatus of any of examples 11-19, wherein the probe check circuitry is a part of a front-end of a processor core.

We claim:
1. An apparatus comprising:
privilege level storage to store a current privilege level;

address check circuitry coupled to the privilege level storage, wherein the address check circuitry is to determine when a linear address associated with an instruction is allowed to access a partition of a linear address space of the apparatus based upon a comparison of the current privilege level and a most significant bit of the linear address, wherein the linear address space comprises a supervisor address space partition and a user address space partition and the most significant bit of the linear address is to indicate which partition of the linear address space the linear address belongs to; and address generation circuitry to generate a physical address from the linear address when the linear address is allowed.

2. The apparatus of claim 1, wherein when the most significant bit of the linear address is a "1" the linear address space partition is a supervisor address space.

3. The apparatus of claim 1, wherein when the most significant bit of the linear address is a "0" the linear address space partition is a supervisor address space.

4. The apparatus of claim 1, further comprising:
a plurality of segment registers, wherein when the linear address associated with an instruction is directed to an access of one of the plurality of segment registers, the address check circuitry is to allow the access.

5. The apparatus of claim 1, further comprising:
a bypass range register to store a bypass range, wherein when the linear address associated with an instruction is directed to an access to a linear address in the bypass range, the address check circuitry is to allow the access.

6. The apparatus of claim 1, wherein when an access to a partition is not allowed, the address check circuitry is to cause pre-fetches, cacheline demotions, and speculative accesses to be canceled.

7. The apparatus of claim 1, wherein when an access to a partition is not allowed, the address check circuitry is to generate a fault for non-speculative accesses.

8. The apparatus of claim 1, wherein when an access to a partition is not allowed, the address generation circuitry is to not perform a translation lookaside buffer or data cache lookup.

9. The apparatus of claim 1, wherein the address check circuitry further comprises a state machine to be executed to determine if an access to a linear address space is allowed.

10. An apparatus comprising:
privilege level storage to store a current privilege level; and
probe check circuitry coupled to the privilege level storage, wherein the address check circuitry is to determine whether a linear address associated with a probe is allowed to access a partition of a linear address space of the apparatus based upon a comparison of the current privilege level and a most significant bit of the linear address, wherein the linear address space comprises a supervisor address space partition and a user address space partition and the most significant bit of the linear address is to indicate which partition of the linear address space the linear address belongs to.

11. The apparatus of claim 10, wherein when the most significant bit of the linear address is a "1" the linear address space partition is a supervisor address space.

12. The apparatus of claim 10, wherein when the most significant bit of the linear address is a "0" the linear address space partition is a supervisor address space.

13. The apparatus of claim 10, further comprising:
a plurality of segment registers, wherein when the linear address associated with the probe is directed to an access of one of the plurality of segment registers, the probe check circuitry is to allow the access.

14. The apparatus of claim 10, wherein when an access to a partition is not allowed, the address check circuitry is to cause speculative accesses to be canceled.

15. The apparatus of claim 10, wherein when an access to a partition is not allowed, the probe check circuitry is to generate a fault for non-speculative accesses.

16. The apparatus of claim 10, wherein when an access to a partition is not allowed, there is not translation lookaside buffer or instruction cache lookup.

17. The apparatus of claim 10, wherein the probe check circuitry further comprises a state machine to be executed to determine if an access to a linear address space is allowed.

18. The apparatus of claim 10, wherein the probe check circuitry is a part of a front-end of a processor core.

* * * * *